United States Patent [19]

Bentley

[11] Patent Number: 4,460,320

[45] Date of Patent: Jul. 17, 1984

[54] SONIC PRESSURE WAVE SURFACE OPERATED PUMP WITH EXTENSIBLE PUMPING ASSEMBLY

[76] Inventor: Arthur P. Bentley, P.O. Box 189, Willcox, Ariz. 85644

[21] Appl. No.: 396,119

[22] Filed: Jul. 7, 1982

Related U.S. Application Data

[63] Continuation-in-part of Ser. No. 254,451, Apr. 15, 1981, Pat. No. 4,398,870, which is a continuation-in-part of Ser. No. 253,317, Apr. 18, 1981, Pat. No. 4,381,177, which is a continuation-in-part of Ser. No. 160,934, Jun. 19, 1980, Pat. No. 4,341,505, which is a continuation-in-part of Ser. No. 958,552, Nov. 8, 1978, Pat. No. 4,259,799.

[51] Int. Cl.³ .............................................. F04F 7/00
[52] U.S. Cl. ..................................... 417/240; 417/378
[58] Field of Search ................ 417/240, 241, 377, 378

[56] References Cited

U.S. PATENT DOCUMENTS

| 1,032,113 | 7/1912 | Chance et al. | 417/240 X |
| 1,114,108 | 10/1914 | Chance et al. | 417/240 X |
| 2,798,435 | 6/1957 | Armstrong | 417/234 X |
| 2,910,004 | 10/1959 | Tessin | 417/240 |
| 4,050,858 | 9/1977 | Ewbank et al. | 417/390 X |
| 4,076,466 | 2/1978 | Swanson, Jr. | 417/390 |
| 4,295,801 | 10/1981 | Bennet | 417/397 |

FOREIGN PATENT DOCUMENTS 1041371 10/1978 Canada .............................. 417/383

Primary Examiner—Leonard E. Smith
Attorney, Agent, or Firm—Herbert E. Haynes, Jr.

[57] ABSTRACT

A sonic pressure wave surface operated pump is provided with a mechanism for controlled movement of a flexible production tube and pumping assembly into and out of contact with a liquid to be pumped and is provided with a sonic pressure wave generator which produces sonic pressure waves of special character in a column of liquid carried in the pump. The sonic pressure waves are transmitted through the flexible production tube by the column of liquid to the pumping assembly for operation thereof and are reflected by the pumping assembly back through the flexible production tube and carry the liquid being pumped in the same direction.

21 Claims, 14 Drawing Figures

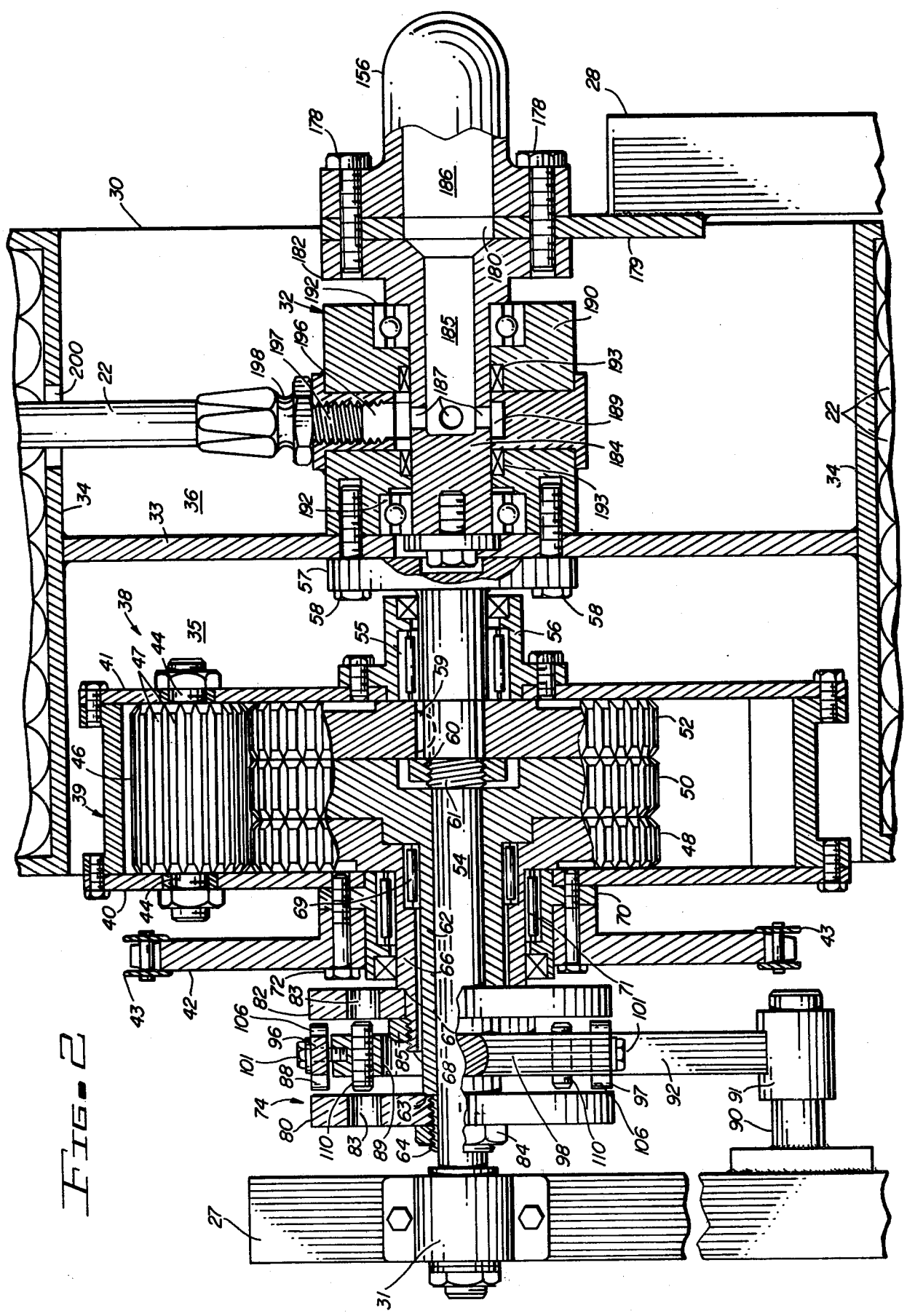

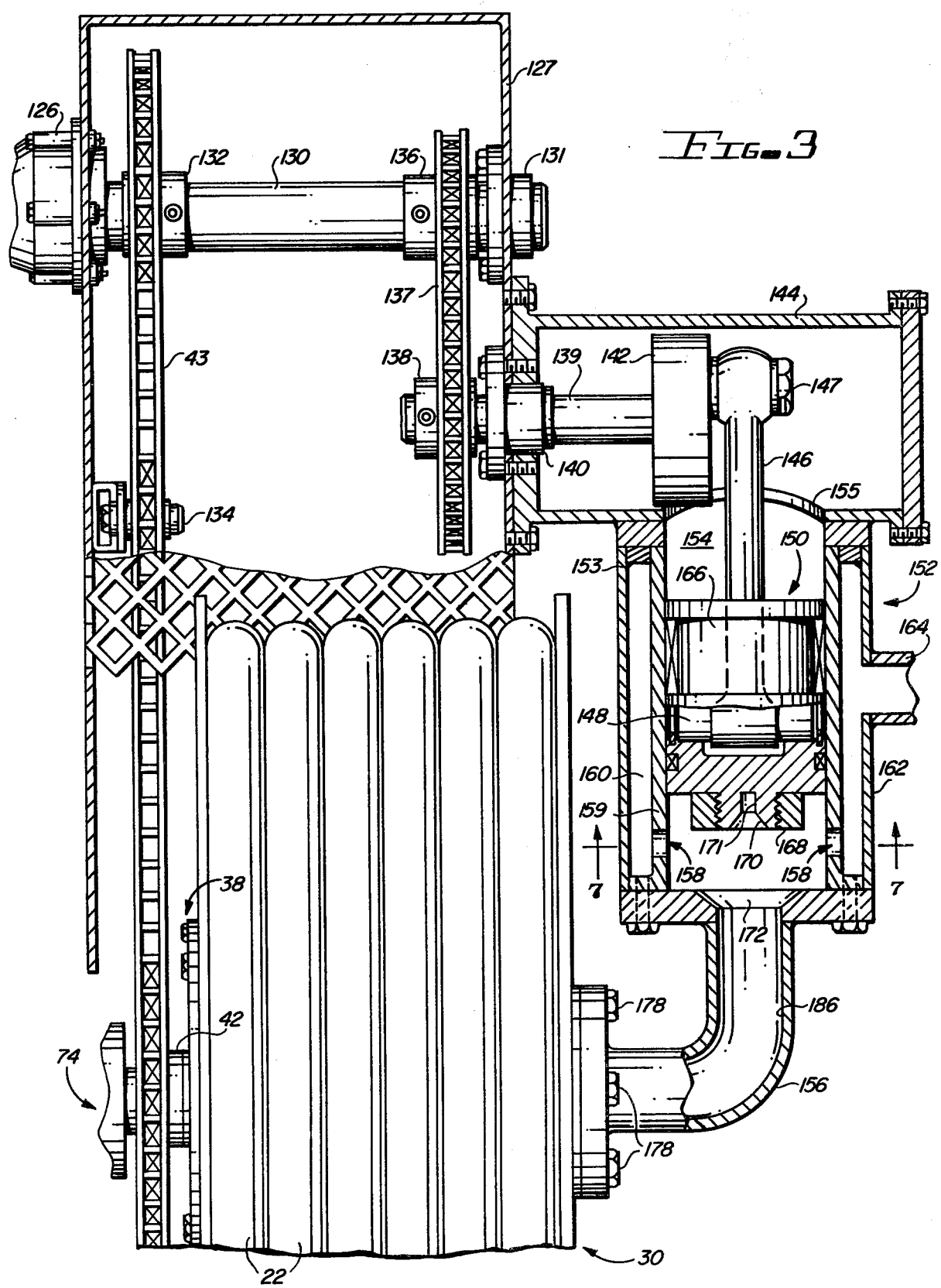

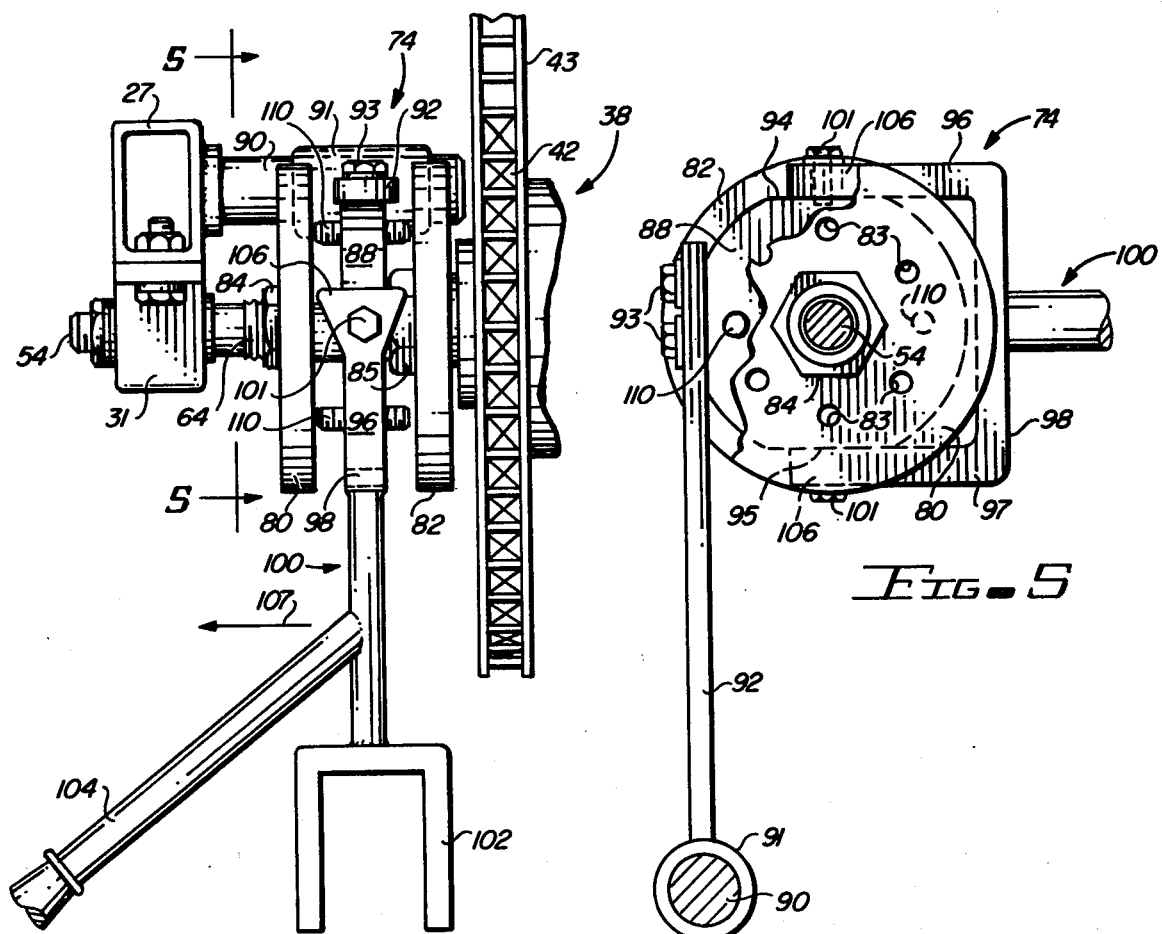

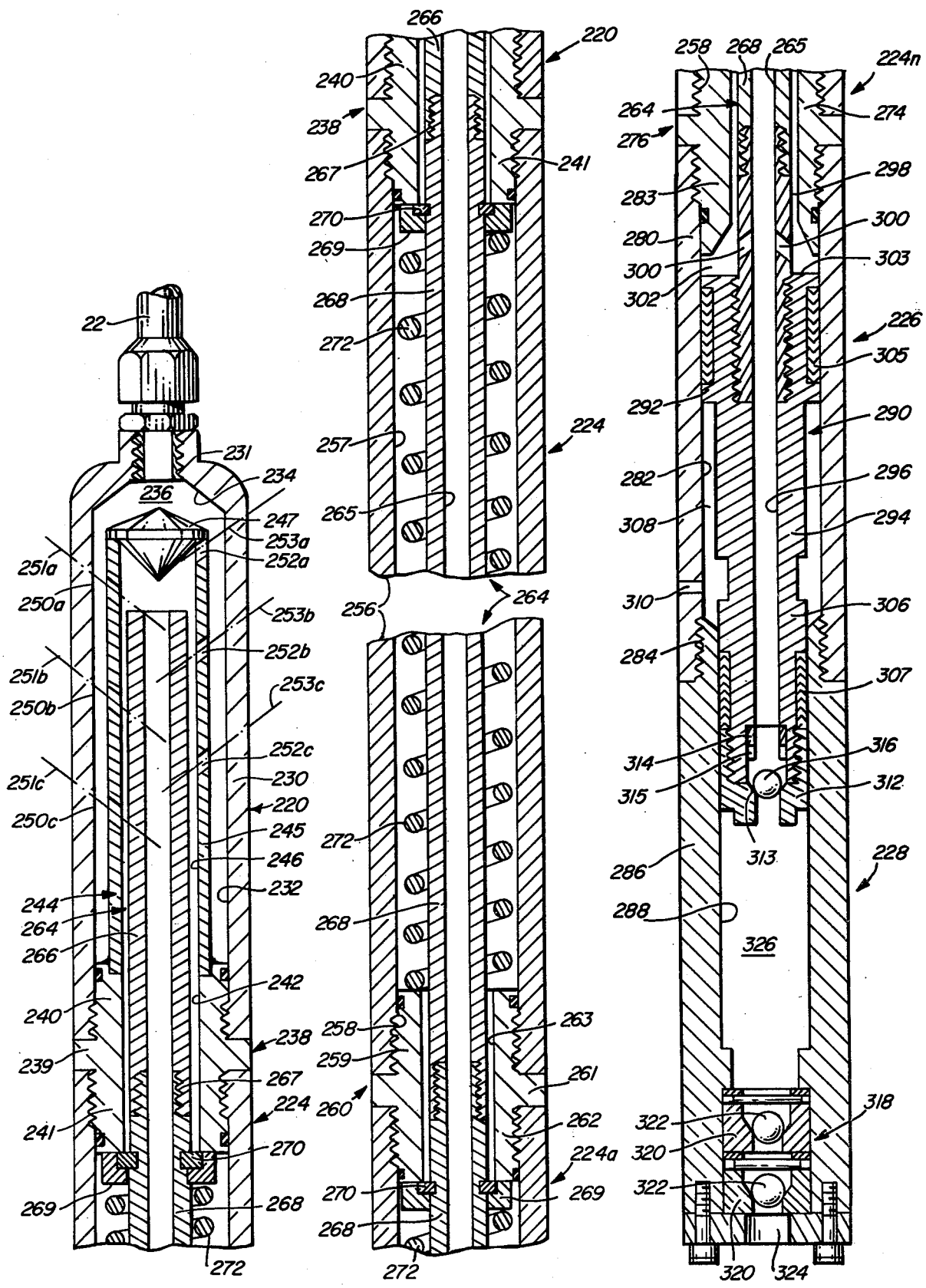

SONIC PRESSURE WAVE SURFACE OPERATED PUMP WITH EXTENSIBLE PUMPING ASSEMBLY

CROSS REFERENCE TO RELATED APPLICATIONS

This application is a continuation-in-part of copending prior U.S. patent application Ser. No. 254,451, filed Apr. 15, 1981, for VARIABLE VOLUME SONIC PRESSURE WAVE SURFACE OPERATED PUMP, which issued as U.S. Pat. No. 4,398,870, which is in turn a continuation-in-part of prior pending application Ser. No. 253,317, filed Apr. 13, 1981, for SONIC PRESSURE WAVE SURFACE OPERATED PUMP, which issued as U.S. Pat. No. 4,381,177, which is in turn a continuation-in-part of prior pending application Ser. No. 160,934, filed June 19, 1980, for SONIC PRESSURE WAVE PUMP FOR LOW PRODUCTION WELLS, which issued as U.S. Pat. No. 4,341,505, which is in turn a continuation-in-part of prior application Ser. No. 958,552, filed Nov. 8, 1978, for SONIC PRESSURE WAVE SURFACE OPERATED PUMP, which issued as U.S. Pat. No. 4,259,799, on Oct. 20, 1981, all by the same inventer.

BACKGROUND OF THE INVENTION

1. Field of the Invention

This invention relates to pumps in general and more particularly to a sonic pressure wave surface operated pump with extensible pumping assembly.

2. Description of the Prior Art

For many years, oil wells which are considered as low production wells, for example, in the range of from 4 to 10 barrels per day, have been capped in that the costs for pumping such small quantities have far exceeded the returns that could reasonably be expected. Even with the high cost of petroleum products today, pumping such small quantities is still not profitable due to the type of pump mechanism in general use. The generally used pumps, sometimes referred to as "walking beam pumps," are very expensive from initial cost, installation, operating, and maintenance standpoints, and as a result, many low production wells remain capped.

Although not quite as bad as prior art oil pumping mechanisms, the pumps in general use for pumping water from subterranean levels, or otherwise, are also very costly.

The most commonly used water pumping mechanisms include an electrically, or otherwise, powered motor which drives a shaft, commonly referred to as "sucker rods," which extend from the motor at ground level downwardly through a well casing to drive a down hole pumping device. In addition to relatively high initial, installation and maintenance costs, such motor driven pumps are costly to operate.

In attempts to reduce the costs associated with the above described oil and water pumping mechanism, another basic type of pumping mechanism has been suggested. This suggested pumping mechanism includes means for imparting intermittent pressure waves on a column of liquid contained in pump tubing which extend from the subterranean source of the liquid to an above ground location. In general, the pressure waves are generated by an above ground mechanism, which reciprocally impacts the column of liquid and, in addition, will cyclically open and close a liquid delivery port. Such impacting of the column of liquid produces pressure waves that are transmitted by the liquid to the down hole pumping device, such as a standing valve to impart a reciprocal movement thereto. The down hole pumping device usually includes a plunger, or similar mechanism, which is biased upwardly by suitable springs and has a central passage formed axially therethrough with a one-way check valve located in the passage. When the hydraulic pressure waves move the plunger down against the spring bias, the check valve opens to admit the liquid being pumped into the passage. And the subsequent upstroke of the plunger closes the check valve and causes a general upward movement of the liquid column with the uppermost portion thereof discharging an amount of liquid, through the delivery port, with the amount being equal to the amount taken in by the downhole pumping device.

Examples of pumping mechanisms which operate generally in the above described manner, are fully disclosed in U.S. Pat. Nos. 2,379,539; 2,355,618; 2,428,460; 2,572,977; 2,751,848 and 3,277,381.

These prior art pumps critically depend on ideal adjustments of the input frequency relative to the length of the pump tubing in which the liquid column is contained. That is, resonant timing. Further, these prior art pumps are seriously limited as to their pumping capacity due to fluid friction, inertia of the liquid, and the like. The problems with resonant timing, frictional losses, and the like, have kept these prior art pumps from becoming commercially successful in general pumping applications, and they are not practical for use in wells having high gas content and low fluid flow rates, in that such conditions render these pumps virtually inoperable.

Another problem with regard to using the prior art pumps is related to pumping liquids, most particularly water, from subterranean levels, and otherwise, when pumping is needed only at relatively infrequent intervals. Examples of instances where infrequent interval, or intermittent pumping are utilized are for the replenishment of the water supply in livestock tanks, the replenishment of water in fire fighting water storage tanks, the sampling of underground water for testing purposes, and the like. It is economically inefficient to utilize one permanently installed prior art pumping mechanisms at each of the multiplicity of sites where intermittent pumping only is needed, and, although it is being done, it is very expensive to install such pumps on a temporary basis.

Therefore, a need exists for a new and improved pumping mechanism which overcomes some of the problems and shortcomings of the prior art.

SUMMARY OF THE INVENTION

In accordance with the present invention, a new and improved sonic pressure wave operated pump is disclosed for highly efficient pumping of liquids from a subterranean level, or otherwise, with said pump being relatively inexpensive to purchase, maintain and operate. The pump is provided with means for extending and retracting a flexible production tube having a down hole pumping assembly on the extending end thereof to facilitate, and thus reduce the costs and labor associated with temporary pumping installations at sites where only infrequent interval pumping is needed.

The pump includes a surface located sonic pressure wave generator of special configuration which generates sonic pressure waves in a column of liquid which is contained within the flexible production tube that extends from the sonic pressure wave generator to the pumping assembly mounted on its extending end, with the pumping assembly being disposed so as to be in communication with the liquid to be pumped. The sonic pressure waves generated by the sonic pressure wave generator travel through the flexible production tube and operate the pumping assembly to admit the liquid to be pumped into the pumping assembly with the reflected sonic pressure waves carrying the admitted liquid from the pumping assembly through the flexible production tube to the sonic pressure wave generator which directs the pumped liquid to a suitable receiving device or facility.

The sonic pressure wave generator includes a cylinder into which the liquid column extends and in which a special piston is reciprocally operable to cyclically impact the liquid column to produce the sonic pressure waves. The liquid impacting of the piston is of ring-like configuration in that it is formed with a centrally located truncated conical recess, or cavity, which extends axially into the piston so as to communicate with a blind cylindrical bore formed axially in the piston. In addition to generating the sonic pressure waves, the reciprocal movement of the piston alternately opens and closes a liquid discharge port arrangement, formed in the cylinder, with the discharge port being coupled to a liquid receiving device or facility.

Cyclic impacting of the liquid column by a piston configured as described above produces sonic pressure waves which move in a spiral-like path through the flexible production tube in a manner which is not fully understood, and operate the pumping assembly with unexpectedly high production capabilities with relatively low power consumption.

In a first embodiment of the pump of the present invention, special means provided in the sonic pressure wave generator is employed to direct the generated sonic pressure waves centrally through the flexible production tube with those waves being reflected by the down hole pumping assembly so that they move back through the flexible production tube adjacent the inner walls thereof and carry the liquid being pumped with them.

In a second embodiment of the pump of the present invention, special means in the sonic pressure wave generator is employed to direct the generated sonic pressure waves so that they move through the flexible production tube adjacent the inner walls thereof and those waves are reflected by the pumping assembly so that they pass back centrally through the production tube to the surface and carry the liquid being pumped with them.

It is believed that the sonic pressure waves moving toward the down hole pumping assembly may form a friction reducing membrane the nature of which is unknown. It is further thought that alternate to, or in conjunction with, the friction reducing membrane, the spirally moving reflected sonic pressure waves may act like a worm gear or lead screw which carries the water being pumped countercurrent to the generated sonic pressure waves.

The down hole, or subterranean pumping assembly includes a sonic intensifier/induction unit which receives the sonic pressure waves from the flexible production tube, increases the velocity thereof and directs them through at least one counter balancing means through a plunger means upon which the sonic pressure waves impinge to reciprocally operate the plunger. The sonic pressure waves are reflected upwardly from the top surface of the plunger and pass back through the production tube to the surface. The counter balancing means are connected to the plunger means so that it is biased upwardly against a given head pressure of the liquid column, and additional head pressure counterbalancing units may be added as needed to the subterranean pumping assembly for deeper wells. The plunger mechanism is moved downwardly by the sonic pressure waves as mentioned above, and a check valve carried by the plunger is operated to admit liquid to the axial passage formed through the plunger means. A liquid intake unit including a check valve means is mounted on the lowermost end of the subterranean pumping assembly for intaking liquid from the underground source. Oscillatory movements of the plunger in response to the sonic pressure waves will charge the liquid intake unit with the liquid being pumped and upon completion of such charging the plunger check valve will open and admit this liquid into the axial passage formed through the plunger.

The reciprocally movable piston of the sonic pressure wave generator is operated by a suitable drive means which is also coupled to selectively drive a suitable reel, or spool, upon which the flexible production tube is wound so that the flexible production tube and the pumping assembly may be easily lowered to subterranean levels for temporary pumping operations, and retracted from such levels upon completion of the pumping task. A reversible transmission is connected to the reel for driving the reel in one direction for paying out the flexible production tube and in the opposite direction for rewinding of the flexible production tube. The transmission, and thus the reel, are controllable by means of a control means having a first, or neutral position which decouples the drive means so that the reel will not be driven in either direction, and a breaking mechanism is provided to hold the reel in a desired position when the control means is in the neutral position. A second position of the control means is employed to shift the transmission so that power from the drive means rotatably drives the reel in one direction, and a third position is provided which shifts the transmission so that the reel is driven in the opposite direction.

Accordingly, it is an object of the present invention to provide a new and useful pump.

Another object of the present invention is to provide a new and useful sonic pressure wave operated pump having higher operating efficiency than other known pumps.

Another object of the present invention is to provide a new and useful highly efficient sonic pressure wave operated pump which is especially configured to facilitate lowering of a flexible production tube and pumping assembly to subterranean levels for pumping of subterranean liquids and to facilitate retrieval of the flexible production tube and pumping assembly from the subterranean level when the pumping task is completed.

Another object of the present invention is to provide a new and useful pump of the above described character which includes a sonic pressure wave generator having an especially configured reciprocally operable piston which cyclically impacts a column of liquid to produce special sonic pressure waves which operate the pump of the present invention with unexpectedly high operating efficiency.

Another object of the present invention is to provide a new and useful pump of the above described character wherein the liquid impacting piston has a truncated conical recess formed centrally in its liquid impacting face with that recess communicating with a blind cylindrical bore formed axially in the piston, with this piston configuration generating the sonic pressure waves so that they move downwardly through the flexible production tube, operatingly impinge on the subterranean pumping assembly, and are reflected back to the surface through the flexible production tube to carry the pumped liquid to the surface.

Another object of the present invention is to provide a new and useful pump of the above described character which includes a reel upon which the flexible production tube is windable with the reel being driven by a suitable drive means which is coupled through a control means and transmission to the reel for selective driving thereof in opposite directions and for decoupling the reel from the drive means.

Still another object of the present invention is to provide a new and useful pump of the above described character wherein a break means is provided for holding the reel in the desired position when the drive means is decoupled.

Yet another object of the present invention is to provide a new and useful pump of the above described character wherein the drive means which is coupled to selectively drive the reel is also coupled to reciprocally operate the special piston of the sonic pressure wave generator of the pump of the present invention.

The foregoing and other objects of the present invention, as well as the invention itself, will be more fully understood from the following description when read in conjunction with the accompanying drawings.

BRIEF DESCRIPTION OF THE DRAWINGS

FIG. 2 is an enlarged fragmentary sectional view taken along the line 2—2 of FIG. 1.

FIG. 3 is an enlarged fragmentary sectional view taken along the line 3—3 of FIG. 1.

FIG. 4 is a fragmentary plan view of the preferred form of control means for operation of the reel upon which the flexible production tube is carried.

FIG. 5 is a fragmentary sectional view taken along the line 5—5 of FIG. 4 and partially broken away to show the various features thereof.

FIG. 6 is an enlarged fragmentary sectional view taken along the line 6—6 of FIG. 1.

FIG. 12 is an enlarged sectional view taken along the line 12—12 of FIG. 1.

FIG. 13 is an enlarged sectional view taken along the line 13—13 of FIG. 1.

FIG. 14 is an enlarged sectional view taken along the line 14—14 of FIG. 1.

DESCRIPTION OF THE PREFERRED EMBODIMENTS

Figure 1:
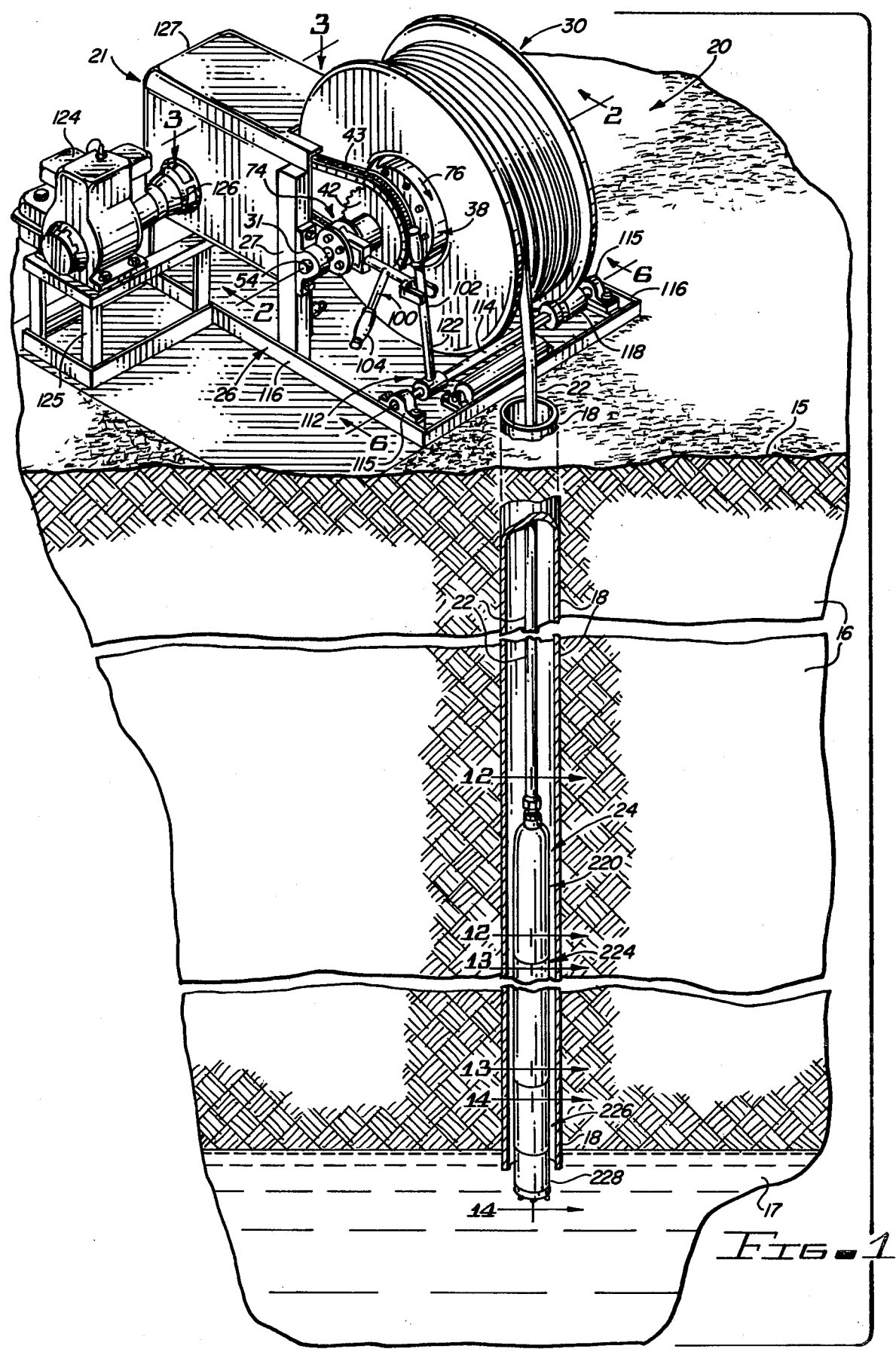
FIG. 1 is a perspective view of the sonic pressure wave surface operated pump with extensible pumping assembly showing the various features thereof and showing it as being installed in a ground formation which is shown in vertical section.

Referring more particularly to the drawings, FIG. 1 illustrates a ground formation having a surface level 15, an underground level 16, a liquid 17 to be pumped, such as water, oil, and the like, and having a suitable well casing 18 extending between the surface level 15 and the liquid 17. The sonic pressure wave surface operated pump with extensible pumping assembly, which is indicated generally by the reference numeral 20 and, for convenience, is hereinafter simply referred to as the pump 20, is seen in FIG. 1 to be installed on and in the ground formation in the conventional manner.

As will hereinafter be described in detail, one of the major components of the pump is an above ground unit 21 which is employed to produce the pump operating sonic pressure waves and receive the pumped liquid 17 from the underground level and direct it to a suitable point of use, or receiving vessel (not shown). The above ground unit 21 is also employed for extending a flexible production tube 22 downwardly through the well casing 18 so that a down hole pumping assembly 24, carried on the extending end of the flexible production tube 22, may be lowered into contact with the liquid for pumping thereof, and for retraction of the flexible production tube 22 and the down hole pumping assembly 24 upon completion of the pumping task.

The pump 20 is intended to be an easily transportable structure so that it may be transported, for example, in the bed of a pickup truck (not shown) from well site to well site wherever substantially infrequent pumping tasks are needed. The above ground unit 21, therefore, includes a suitable frame 26 having a spaced pair of standards 27 and 28 between which a reel 30 is rotatably journaled, as seen best in FIG. 2, by means of a suitable bearing 31 provided on the standard 27 and a liquid coupling joint 32 which, as will hereinafter be described in detail, is carried on the standard 28.

The reel 30 is provided with a circular center plate 33 having an endless rim 34 of substantially U-shaped cross section fixed on the periphery of the center plate, with the rim providing the reel with means for winding of the flexible production tube 22 thereon. With the reel 30 configured in this manner, it defines axial cavities 35 and 36 on opposite sides of the central plate 33 with a reversible transmission 38 being axially disposed in the cavity 35 and the above mentioned liquid coupling joint 32 being axially disposed in the other cavity 36.

Although any suitable transmission may be employed to accomplish the desired objective which will become apparent as this description progresses, an ideal transmission for this purpose is fully disclosed in U.S. Pat. No. 3,438,284, issued on Apr. 15, 1969, to A. P. Bentley. To insure a complete disclosure and to place the transmission 38 of the referenced patent in the environment of the instant pump 20, the following description of the transmission 38 is presented.

The transmission 38 includes a generally cylindrical housing 39 having opposite end closing plates 40 and 41, The end plate 40 has a sprocket 42 connected fast thereto for rotational driving of the housing 39 by means of a chain 43 which passes over the sprocket as will hereinafter be described. The end closing plates 40 and 41 are suitably bored adjacent a radial outer portion of each plate to receive the oppositely extending shafts 44 of a satellite or planet gear 46 having teeth 47 formed about its periphery, with those teeth being in meshed engagement with three gears 48, 50 and 52, which are mounted in juxtaposed relationship within the housing 39.

The end closing plate 41 has an axial bore formed therethrough through which one end of an output shaft 54 extends with that end being carried in a suitable bearing 55 mounted in a bearing housing 56 which is mounted so as to extend axially from the housing 39. That same end of the output shaft 54 has a suitable flange 57 formed thereon and is affixed to the central plate 33 of the reel 30 by plural bolts 58. The other end of the output shaft 54 extends oppositely and axially from the housing 39 and has its extreme end carried in the bearing 31 provided on the frame standard 27.

The gear 52, which is adjacent the end closing plate 41 and has, for example, 50 teeth formed about its periphery, is fixed for rotation with the output shaft 54 such as by means of the key 59, and is held against axial movement by means of the nut 60 carried on threaded portion 61 of the shaft. The second, or middle gear 50 having, for example, 49 teeth formed about its periphery, is provided with an integral axially extending tubular sleeve 62 which acts as a bearing for the output shaft 54 which extends coaxially therethrough, and the extending end of the sleeve has a shoulder 63 and reduced diameter threaded portion 64 formed thereon. The third gear 48, having, for example, 51 teeth formed about its periphery, is similarly provided with an axially extending sleeve 66 having a shoulder 67 and reduced diameter threaded portion 68 on its extending end. The sleeve 66 of the third gear 48 is coaxially disposed on the sleeve 62 of the second gear 50 and is rotatable about the sleeve 62 by means of a bearing 69.

The output shaft 54, the sleeve 62 of gear 50 and the sleeve 66 of gear 48 all extend axially from the housing 39 through a bearing housing 70 which is mounted fast on the end plate 40. The bearing housing 70 has a suitable bearing 71 mounted in its bore which is in engagement with the periphery of the sleeve 66 of the third gear 48 so that the sleeve is rotatably journaled therein. As seen, the sprocket 42, which drives the transmission, is mounted on the bearing housing 70 and suitable bolts 72 are used to mount both the sprocket and bearing housing fast on the end closing plate 40 of the transmission housing 39.

A control means, which is indicated generally by the reference numeral 74, is carried on the axially extending output shaft 54, and the sleeves 62 and 66 of the transmission. The control means 74, as will hereinafter be described in detail, provides means by which an operator of the pump 20 may hold the transmission 38 in a neutral position, i.e., no rotational output of the shaft 54, or hold one or the other of the gears 48 or 50 to selectively drive the output shaft 54, and thus the reel 30, in one direction or the other.

In operation of the transmission 38, it will be assumed that it is being rotatably driven, in the direction indicated by the arrow 76 in FIG. 1, by the chain 43 and sprocket 42. Such rotational driving of the transmission 38 will cause the housing 39 to rotate about the axis of the output shaft 54 and this will, of course, cause the satellite gear 46 to move in the same direction. When the control means 74 is in the neutral position, it will not exert any holding forces on the gears 48 and 50 and they will be free to rotate. The gear 52 which is keyed to the output shaft 54 will be held against rotation by the load imposed thereon by the reel 30 via the output shaft. Thus, the rotatably driven housing 39 will simply rotate about the axis of the shaft 54 and the satellite gear 46 will, by virtue of its meshed engagement with the gear 52, will revolve about its own axis and about the gear 52 which is held stationary due to the load thereon. The gears 48 and 50 will be rotatably driven about the axis of the output shaft 54 since there is no load imposed on those gears.

When the control means 74 is moved, by the operator, the satellite gear 46, which moves with the rotatably driven housing 39, will roll about the held gear 50 and will rotatably carry the gear 52 and thus the output shaft 54 with it. A differential action occurs as a result of the different number of teeth on the held gear 50 and the driven gear 52. In the example previously given, the driven gear 52 has one more tooth than the held gear 50 and thus, the driven gear will advance one tooth in the direction of the arrow 76 (FIG. 1) for each complete revolution of the transmission housing 39. The advancing driven gear 52 will carry the output shaft 54 with it, and therefore, the reel 30 will be driven in the same direction as the arrow 76 which causes a paying out of the flexible production tube 22 carried on the reel.

When the control means 74 is positioned, again by the operator, to hold the gear 48, the satellite gear 46 will now roll about the held gear 48 and the satellite gear 46 will rotatably drive the gear 52, the output shaft 54 and thus the reel 30. Again, the differential action comes into play. In the hereinbefore given example, the driven gear 52 has one less tooth than the gear 48 which is now being held, with the result being that the driven gear 52 will move one tooth in the direction opposite to the arrow 76 (FIG. 1) for each complete revolution of the transmission housing. Thus, the driven gear 52, output shaft 54, and the reel 30 will move in the reverse direction in comparison to the above described holding of gear 50, which, of course, causes rewinding of the flexible production tube 22 on the reel 30.

As seen in FIGS. 2, 4 and 5, the control means 74 includes a spaced pair of discs 80 and 82 each of which is provided with a plurality of holes 83 formed therethrough and disposed to lie on a diameter of the discs. The disc 80 is fixedly carried on the threaded end 64 of the sleeve 62 of the gear 50 by means of a nut 84, and the disc 82 is similarly carried on the threaded end 68 of the sleeve 66 of the gear 48 by means of the nut 85. In this manner, the disc 80 is fixed for rotation with gear 50 and is employed for holding that gear stationary for the purpose described above, and the disc 82 is fixed for rotation with the gear 48 and is employed to hold that gear stationary. An intermediate disc 88 is interposed between the discs 80 and 82 with the disc 88 having an axial bore 89 through which the output shaft 54 and the sleeves 62 and 66 of the transmission 38 freely pass. A trunion 90 is mounted so as to extend from the frame standard 27 and a sleeve 91 is axially slidably carried on the trunion 90. A strap 92 extends integrally and radially from the slidable sleeve 91 and its extending end is fixedly attached to the intermediate disc 88 by bolts 93. The trunion 90 in cooperation with the sleeve 91 and the strap 92 holds the intermediate disc 88 against rotation and allows it to be moved, as will be explained, axially between the discs 80 and 82.

The intermediate disc 88 is provided with a diametrically opposed pair of flats 94 and 95 to which the spaced arms 96 and 97 of the bifurcated end 98 of a control lever 100 are pivotably attached such as by suitable bolts 101. The control lever 100 is provided with a yoke 102 on its opposite end, for reasons which will hereinafter be described in detail, and an integral handle portion 104 extends angularly from the control lever. The extending end of each of the arms 96 and 97 of the bifurcated end 98 of the control lever 100 is formed with a substantially triangularly shaped fulcrum 106 thereon, as seen best in FIG. 4.

By pivotably moving the control lever in the direction of the arrow 107 of FIG. 4, the fulcrums 106 will be moved into bearing engagement with the disc 82 which produces an axial movement of the intermediate disc 88 toward the disc 80. When so moved, a diametrically opposed pair of pins 110, which are fixedly carried by the intermediate disc 88 so as to extend oppositely therefrom, move into engagement with an aligned diametrically opposed pair of holes 83 of the disc 80 and thus hold the disc 80, and the gear 50 attached thereto, stationary. This, as previously described, will drive the reel 30 in the direction of the arrow 76 of FIG. 1.

Likewise, pivotable movement of the control lever 100 in the direction opposite to the arrow 107 (FIG. 4) will move the intermediate disc 88 into holding engagement with the disc 82 which holds the gear 48 stationary to produce reverse driving of the reel 30. Of course, when the control lever 100 is in its central position as shown in FIG. 4, both gears 48 and 50 of the transmission 38 will be free to rotate which, as hereinbefore described, constitutes the neutral position of the transmission and the reel 30 remains stationary, i.e., it is not driven.

When the reel 30 is not being driven, it is still free to move, if, for example, the weight of the flexible production tube 22 and the downhole pumping unit 24 exert an unwinding force thereon. Such an unwinding force will be exerted when, for example, the down hole pumping unit 24 is suspendingly positioned in the well as shown in FIG. 1. In deep wells, the unwinding forces can be very strong, not only when the pumping unit 24 is in its pumping position, but also during lowering thereof into the well. For these reasons, a brake means 112 is provided, as shown in FIGS. 1 and 6, to counteract the unwinding forces exerted on the reel 30 when the pumping unit 24 is in its pumping position and to prevent runaway during lowering of the unit 24 into the well.

The brake means 112 includes a rock shaft 114 which is journaled at its opposite ends in suitable bearings 115 carried on the spaced parallel rails 116 of the frame 26. A brake cam 118 is eccentrically carried on the rock shaft 114 for rotary movement therewith and the brake cam 118 is disposed thereon so that an annular groove 119 formed in the cam body 120 is aligned with one of the endless edges 121 (FIG. 6) of the rim 34 of the reel 30 and is movable into and out of engagement with that edge. Rocking movement of the rock shaft 114 is applied by means of a brake handle 122 which, as seen in FIG. 1, is aligned with the yoke 102 of the control lever 100 of the control means 74. Movement of the brake handle 122 into the yoke 102, as shown in FIG. 1, will apply the brakes to the reel 30 and movement out of such engagement will release the brakes. The reason for the relationship between the brake handle 122 and the yoke 102 is to insure that the brake means 112 will not be fully applied unless the control lever 100 is in its centered position to place the transmission 38 in neutral, in other words, to prevent the reel 30 from being driven with the brakes on.

As seen in FIG. 1, the pump 20 includes a drive means 124 which is supportingly carried on a frame portion 125 which is an integral part of the main frame 26. In a test unit, the drive means was in the form of a small 2½ horse power internal combustion engine of the type illustrated. However, it should be understood that the pump 20 of the present invention may be operated with any suitable drive means such as an electric motor (not shown).

The illustrated drive means 124 has a suitable gear reduction unit 126 which is attached to a safety housing 127 which encloses the power coupling chains, sprockets and provides support for bearings, and the like, as will be described.

Referring now to FIG. 3, wherein the output shaft 130 of the drive means 124 is shown as extending from the gear reduction unit 126 with its extending end being supportingly journaled in a suitable bearing 131 carried on the safety housing 127. A first drive sprocket 132 is fixedly carried on the output shaft 130 with the chain 43 passing over that sprocket. In this manner, power from the drive means 124 is transmitted by the drive sprocket 132, and the chain 43, to the sprocket 42 which drives the reversible transmission 38 as hereinbefore described. As shown, an idler sprocket 134 is provided for tension adjustment of the chain 43.

A second drive sprocket 136 is fixedly carried on the output shaft 130 adjacent its extending end and a chain 137 passes around that sprocket in the usual manner. The chain 137 passes over a driven sprocket 138 which is fixedly carried on one end of a drive shaft 139 which is supportingly journaled for rotation in bearing means 140. The opposite end of the drive shaft 139 has a flywheel 143 integrally formed thereon, with the flywheel being enclosed in a suitable housing 144. A crankshaft 146 is pivotably connected on one of its ends, by means of a suitable bolt 142 which is eccentrically carried by the flywheel 142 with the other end of the crankshaft connected by a suitable wrist pin 148 to a liquid impacting piston 150 of a sonic pressure wave generator which is indicated generally by the reference numeral 152.

The sonic pressure wave generator 152 includes a generally cylindrical housing 153 having a cylindrical bore 154 in which the liquid impacting piston 150 is reciprocally mounted, with the bore being open as at 155 to admit the crankshaft 146. The opposite end of the cylindrical bore is open and is coupled by means of an elbow conduit 156 to the liquid coupling joint 32 (FIG. 2) which places the bore 154 of the housing 153 of the sonic pressure wave generator 152 in liquid communication with the flexible production tube 22 as will hereinafter be described in detail.

The cylindrical bore 154 of the housing 153 is provided with an annular array of apertures 158 formed through the sidewall 159 thereof so that the bore 154 communicates with an annular chamber 160 formed by a jacket 162 which circumscribes the bore. The annular array of apertures 158 collectively form liquid flow ports which, direct pumped liquid into the annular chamber 160 which is subsequently directed through an output port 164 for directing the pumped liquid to a point of use or receiving vessel, (not shown) in a manner which will become apparent as this description progresses.

The fluid impacting piston 150 includes the usual piston body 166 with a special liquid impacting face 168 formed thereon. The special face 168 has a truncated conical cavity, or recess, 170 formed axially therein with the inner end of that cavity being in communication with a blind cylindrical bore, or socket 171 formed axially in the piston body. Thus, the liquid impacting face 168 of the piston 150 is of substantially ring-like configuration.

A standing column (not shown) of the liquid being pumped is contained in the down hole pumping unit 24, the flexible production tube 22, the coupling joint 32, the elbow conduit 156 and in the housing 153 of the sonic pressure wave generator 152 so that reciprocal movement of the special piston 150 will cyclically impact the standing column of liquid. The special configuration of the liquid impacting face 168, in conjunction with a sonic nozzle 172 formed in the housing 153 at the point where the cylindrical bore 154 opens into the elbow conduit 156, generates sonic pressure waves which move through the elbow conduit 156, liquid coupling joint 32, the flexible production tube 22 and enter into the down hole pumping assembly for operation thereof and are reflected by the pumping assembly back to the sonic pressure wave generator 152 and carry the liquid to be pumped with them. It will be noted that the liquid impacting stroke of the piston 150 will move the piston so that it will cover the array of apertures 158 and thus close the liquid delivery port 164 during that portion of the piston stroke.

As will hereinafter be described in detail, the sonic pressure wave generated in the sonic pressure wave generator 152 moved to the down hole pumping unit in what has been determined by testing to be a spiral-like path. It has been further determined that the configuration of the annular array of apertures 158 formed so as to extend through the sidewall of the cylindrical bore 154 into the annular chamber 160 has a direct effect on the location of that spiral-like movement path.

Figure 7:
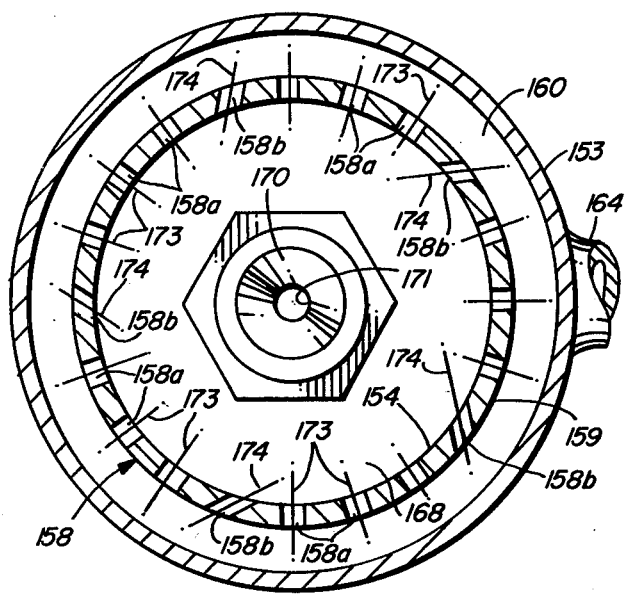
FIG. 7 is an enlarged fragmentary sectional view taken along the line 7—7 of FIG. 3.

Referring now to FIG. 7, wherein a specific configuration of the annular array of apertures 158 is illustrated. The array of apertures 158 is seen to be made up of a plurality of radially disposed apertures 158a, i.e., their axes 173 are radially disposed with respect to the bore 154 and a plurality of especially disposed apertures 158b arranged at equal intervals among the radial apertures 158a. The especially disposed apertures 158b have their axes 174 offset from the radial in the manner shown. Exactly what this type of aperture arrangement does to the sonic pressure waves is unknown, in other words, it is not known if this aperture configuration effects the generated waves, the reflected waves, or both. However, the end result is known. The generated waves move in the spiral-like path centrally, or about the axis, through the elbow conduit 156, the coupling joint 32 (FIG. 2) and the bore of the flexible production tube 22 and the reflected waves return in a spiral-like path which is located adjacent the inner walls which define the bores of those components which connect the down hole pumping unit with the sonic pressure wave generator 152.

Although the precise number of the apertures 158a, 158b, the exact angle, and the like, are not critical, i.e., the number and angles can vary somewhat, it has been found that when the total number of apertures 158a and 158b are 20, with three of the radial apertures 158a between each of the angularly offset apertures 158b, which total five in number, and each of the apertures 158b are offset relative to the radial at an angle of about 3½°, the desired objectives are obtained. Another way of accomplishing this objective is to provide a total of seven of the angularly offset apertures (not shown) at about the same 3½° angle, with two of the radial apertures interposed between each offset aperture for a combined total of 21 apertures.

Figure 8:
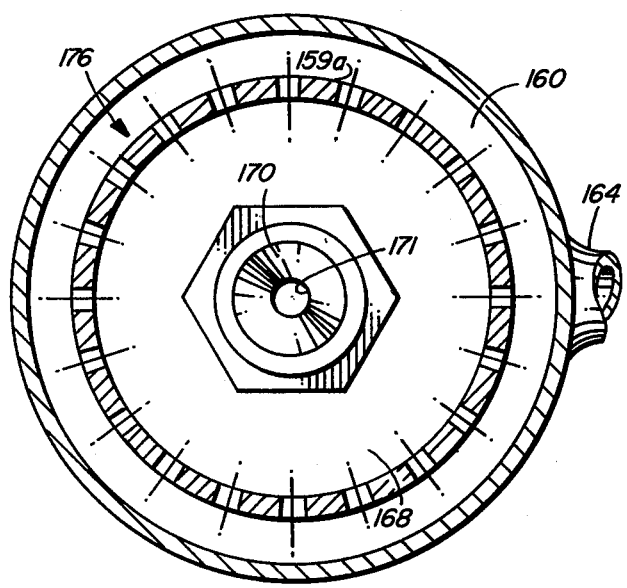
FIG. 8 is a view similar to FIG. 7 and showing a modified portion of the pump of the present invention.

With reference now to FIG. 8, wherein another aperture array 176 is shown as being formed through the sidewall 159a which circumscribes the bore 154 of the sonic pressure wave generator. In this configuration, all of the individual apertures which form this array are radially disposed with the result being that the generated waves move toward the down hole pumping unit in a spiral-like path which is disposed adjacent the inner walls which define the bores of the components which connect the generator 152 and the pumping unit 24, and the reflected waves, and the liquid carried therewith, move centrally back through the bores of those components to the generator 152.

Referring once again to FIG. 2, wherein it is seen that the elbow conduit 156 is attached, such as with bolts 178, to a support bracket 179, having a central aperture 180, with the bracket being fixedly carried on the frame standard 28, and those same bolts 178 also attach a flanged end 182 of the fixed central shaft 184 of the coupling joint 32 to the bracket 179. The fixed shaft 184 is formed with a blind bore 185 therein the open end of which is in communication, through the aperture 180 of the support bracket 178, with the bore 186 of the elbow conduit 156. The opposite end of the blind bore 185 is provided with a plurality of radial ports 187 adjacent its closed end which communicate with an annular chamber 189 formed in a rotatable joint body 190 which is coaxially carried on the fixed shaft 184 with the chamber 189 being disposed to circumscribe the radial ports 187. A spaced pair of bearings 192 are carried on the periphery of the fixed central shaft 184, as well as suitable seals 193, so that the joint body 190 is journaled for rotation about the fixed central shaft 184. The joint body 190 is fixedly attached, such as by means of the previously described bolts 58, to the central plate 33 of the reel 30, and is thus rotatably movable therewith. A radial port 196 is formed in the joint body 190 so as to communicate with the annular chamber 189 thereof, and a suitable fitting 197 is mounted in the radial port 196. The flexible production tube 22 is provided with an end fitting 198 which is threadingly connected to the joint body fitting 197. The flexible production tube 22 extends from its above described connection to the liquid coupling joint 32, through an opening 200 formed on the rim 34 of the reel 30 and is wound on the reel in the known manner.

From the above, it will be seen that the liquid coupling joint 32 provides liquid communication at all times between the rotatably movable flexible production tube 22 and the bore 156 of the fixed elbow conduit 156.

Figure 9:
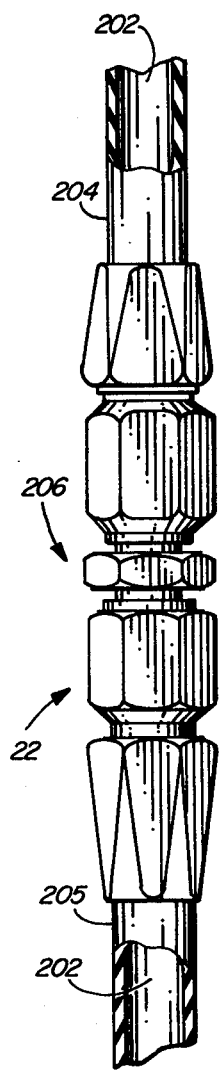
FIG. 9 is a fragmentary side elevational view partially broken away of a segment of the flexible production tube usable in the pump of the present invention.

The flexible production tube 22 is, in a first embodiment as shown in FIG. 9, a conventional heavy duty flexible hose having a bore 202, and formed, for example, of Neoprene, or other suitable material. In some instances the flexible production tube 22 may be in the form of a single length of such tube. However, for use in all but very shallow wells, those say about 100 feet in depth, the production tube 22 is more conveniently formed of a plurality of tube sections 204 and 205 which are interconnected by a fitting arrangement such as is shown at 206 in FIG. 9. This type of flexible production tube 22, and the modified form thereof which is identified as 22a in FIG. 10 to be hereinafter described, is for use when the pump 20 is provided with the aperture array 158 (FIG. 7) in the sonic generator 152 thereof. In other words, the tubes 22 and 22a will work when, as described above, the generated sonic pressure waves move centrally therethrough and the reflected waves move against the inner walls which define the bore 202 of the production tube, and will not work when the flow paths of the sonic pressure waves are reversed as is the case when the aperture array 176 of FIG. 8 is employed.

Figure 10:
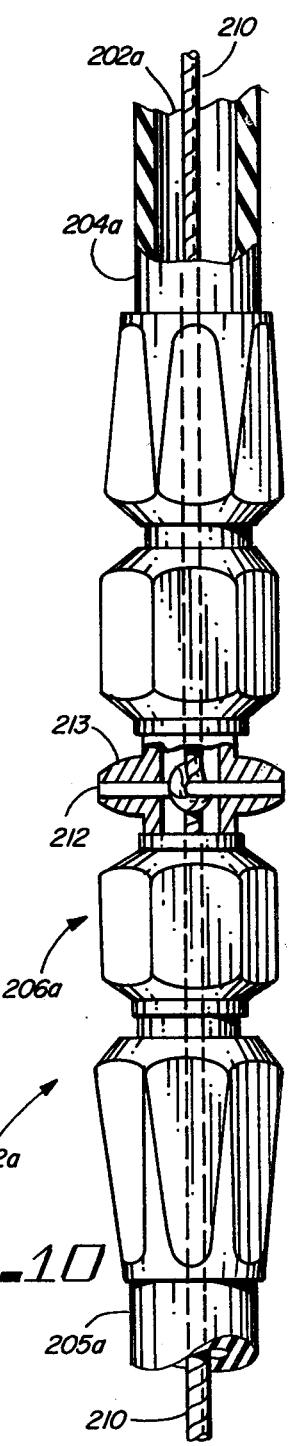
FIG. 10 is a view similar to FIG. 9 and illustrating a modification of the flexible production tube of FIG. 9.

When the length of the flexible production tube is longer than about 400 feet, a safety cable 210 may be installed therein as shown in the modified production tube 22a of FIG. 10. The cable 210 is carried in the bore 202a of the tube 22a and is connected, such as by means of a transverse pin 212 carried in the union 213 which is a part of a typical one of the fitting arrangements 206a which interconnect the plural segments 204a and 205a which make up this modified production tube 22a. The safety cable 210 helps support the weight of the down hole pumping unit 24 and of the flexible production tube 22a to guard against fitting and/or tube failures which may result from this weight.

Figure 11:
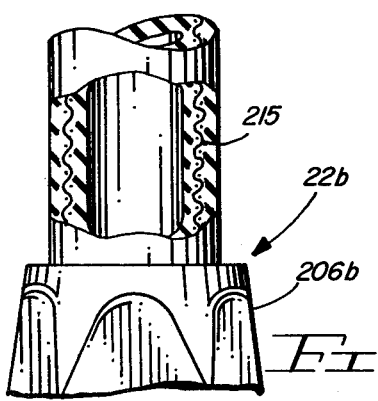
FIG. 11 is a view similar to FIG. 9 and illustrating another form of the flexible production tube usable in the pump of the present invention.

Referring now to FIG. 11, wherein a portion of another modified flexible production tube 22a is illustrated. In this embodiment, the plural sections (one shown) which make up the tube 22b have a metallic wrapping, or web, 215 embedded in the Neoprene, or other material, of which it is fabricated. This manner of fabricating the tube 22b is well known, in that such tubing is commonly used, for example, in hydraulic systems. When the pump 20 is provided with the aperture array 176 shown in FIG. 8, this metallic web 215 is needed to make the pump work. Just why this is so is unknown, but the metallic web 215 must be in physical contact with the above ground unit 21, each fitting arrangement 206b of the production tube 22b, and with the down hole pumping unit. If such physical contact is not made, then the pump 20 won't work.

It will be noted however, that the metallic web 215 is needed only when the generated sonic pressure waves move toward the pumping unit 24 in the spiral-like path against the inner walls of the various bores of the components which connect the generator 152 and the pumping unit 24.

As hereinbefore mentioned, the flexible production tube 22 is extensibly positionable into the ground formation, and the down hole, or subterranean pumping assembly 24 is mounted on the depending end thereof. The subterranean pumping assembly 24, as shown in FIG. 1, includes a sonic intensifier/induction unit 220, at least one head pressure counterbalancing unit 224, an underground operating mechanism 226 and a liquid intake unit 228.

FIG. 12 illustrates the sonic intensifier/induction unit 220 as including an elongated cylindrical housing 230 which is preferably so configured due to the ease of lowering such a housing down through a conventional well casing 18 (FIG. 1). The housing 230 has an internally threaded boss 231 formed on its upper end with a suitable fitting mounted therein for threaded attachment of the depending end of the flexible production tube 22 and has an axial bore 232 formed therethrough. The bore 232 of the housing 230 is of larger diameter than the bore 202 of the production tube 22, and is in liquid communication therewith. The transition between the bores 202 and 232 is special in that this transition is accomplished by a truncated conical surface 234 which, in conjunction with the cylindrical bore 232 defines a sonic intensifier chamber 236. The sonic pressure waves, which are produced in the sonic pressure wave generator 152 (FIG. 3), and are transmitted in the liquid column (not shown) and move downwardly through the flexible production tube 22 are received in the sonic intensifier chamber 236 as they emerge from the flexible production tube and those waves are increased in velocity within the chamber 236.

The cylindrical housing 230 is internally threaded at its depending end and has a special nipple 238 mounted therein. The nipple 238 has the usual centrally disposed annular flange 239, upwardly extending threaded boss 240, downwardly extending threaded boss 241 and an axial passage 242. A sonic pressure wave inductor 244 is mounted on the upwardly extending threaded boss 240 of the nipple 238, such as by welding, so as to be upstanding therefrom within the bore 232 of the housing 230. The inductor 244 serves two purposes; first, to prevent downward migration of foreign matter which may have been inadvertently introduced into the mechanism, and secondly, to introduce the downwardly moving sonic pressure waves into the below mounted portions of the subterranean pumping assembly 24.

The sonic pressure wave inductor 244 includes an elongated tubular body 245 having a bore 246, and a head 247 of special configuration is mounted on its upper end. The special head 247 is seen to include an inverted cone 248 which depends axially into the bore 246 of the body 245. A spaced vertically aligned plurality of apertures 250a, 250b, and 250c are formed through one side of the tubular body 245, and a similar plurality of apertures 252a, 252b and 252c are spacedly arranged in vertical alignment on the diametrically opposed side of the tubular body.

Each of the apertures 250a, 250b and 250c lie on downwardly and inwardly sloping axes which are indicated at 251a, 251b and 251c, respectively. As seen, the axes 251a, 251b and 251c are parallel with respect to each other and form a non-critical angle of about 45° from the vertical. Similarly, each of the apertures 252a, 252b and 252c lie on downwardly and inwardly sloping axes which are indicated at 253a, 253b and 253c, respectively. The axes 253a, 253b and 253c are parallel with respect to each other and form a non-critical angle of about 45° from the vertical, and since the apertures 252a, 252b and 252c are on the diametrically opposed sides of the body 245, their axes 253a, 253b and 253c slope oppositely from the axes of the apertures 250a, 250b and 250c. As seen, the apertures 250a, 250b and 250c are vertically and downwardly offset from the apertures 252a, 252b and 252c so that their axes intersect at locations which are laterally offset from the vertical axis of the housing 245. It will also be noted that the depending end of the inverted cone 248 falls on the axis 253a of the aperture 252a.

The exact effect that the above described configuration of the sonic pressure wave inductor 244 has on the downwardly moving sonic pressure waves, and the liquid which is subsequently carried to the surface on the reflected pressure waves is unknown. It is known however, that if this configuration is modified beyond acceptable limits, the efficiency of the pump will fall off and if the modification is excessive, the pump will cease to function altogether. For example, the exact angle of the axes 251a, 251b and 251c and 253a, 253b and 253c need not be exactly 45°, however, the efficiency of the pump will suffer if the range of say, 40° to 50° is exceeded in either direction. Further, the depending end of the cone 248 may be lowered so that it crosses the axis 253a instead of falling thereon. This does not seem to impair the efficiency of the pump, but if the depending end of the cone 248 is raised so that it does not at least fall on the axis 253a, the pump's efficiency will fall off drastically.

Apparently, the above described configuration relationships of the sonic pressure wave inductor 244 corresponds with the travel paths of the downwardly moving sonic pressure waves and the subsequent upward movement of the liquid carried by the reflected sonic pressure waves.

As will hereinafter be described, the underground operating mechanism 266 must be biased upwardly an amount which corresponds approximately to the head pressure exerted by the liquid column (not shown) contained in the pump of the present invention.

Therefore, the subterranean pumping assembly 24 includes at least one head pressure counterbalancing unit 224. The head pressure counterbalancing unit 224 includes an elongated cylindrical housing 256 having an axial bore 257 extruding therethrough, and having internal threads formed in the upper end of the housing by which it is threadingly connected to the downwardly extending boss 241 of the special nipple 238. The housing 256 is also formed with internal threads 258 at its lower end for threaded attachment to the upper threaded boss 259 of a nipple 260 which has the usual annular flange 261, threaded lower boss 262 and axial passage 263.

An elongated tube assembly, which is indicated generally by the reference numeral 264, is axially disposed in the subterranean pumping assembly 24, and as will hereinafter be described, the tube assembly 264 is axially movable, has a bore 265, and is formed of a plurality of tube segments, the exact number of which is determined by the head pressure.

The elongated tube assembly 264 includes a top tube segment 266 which is coaxially disposed within the bore 246 of the sonic pressure wave inductor 244, and is threadingly attached as at 267 to an extender tube segment 268. The extender tube segment 268 is coaxially disposed in the bore 257 of the housing 256 of the head pressure counterbalancing unit 224, and an annular ring 269 is fixedly secured adjacent the upper end of the extender tube segment 268 by a suitable keeper 270. A compression spring 272 is interposed between the downwardly facing surface of the annular ring 269 and the flattened top end of the upper threaded boss 259 of the nipple 260. The compression spring 272 is designed to counterbalance a given head pressure and does so, as will become apparent as this description progresses, by exerting an upwardly directed biasing force on the elongated tube assembly 264. The spring 272, of course, has physical limitations and thus, when the head pressure of a particular installation exceeds the counterbalancing capabilities of the spring 272, additional head pressure counterbalancing units 224a–224n (FIGS. 13 and 14) may be added on an as needed basis.

It will be understood that each of the additional head pressure counterbalancing units 224a–224n are identical to the above described counterbalancing unit 224 and thus, no detailed discussion thereof is deemed necessary.

As seen in FIG. 14, the lowermost head pressure counterbalancing unit 224n has the internal threads 258, which are formed in the lower end of its cylindrical housing 256, threadingly attached to the upper threaded boss 274 of a nipple 276 which is carried in the upper end of the underground operating mechanism 226.

The underground operating mechanism 226 includes a cylindrical housing 280 having a bore 282, with the housing internally threaded at its upper end for attachment to the lower threaded boss 283 of the nipple 276, and has internal threads 284 formed on the lower end thereof.

The liquid intake unit 228, as will hereinafter be described in detail, includes a cylindrical housing 286 having a bore 228, and is threadingly attached to the lower internal threads 284 formed in the bottom of the underground operating mechanism's housing 280.

A plunger 290 is reciprocally mounted in the bore 282 of the housing 280 and is formed with a head portion 292 from which a reduced diameter spool valve body 294 depends. The plunger 290 is formed with an axial bore 296 extending therethrough, and internal threads are provided in the upper end of the axial bore for attaching the plunger to the lowermost tube segment 298 of the elongated tube assembly 264. The lower tube segment 298 is threadingly attached to the depending end of the extender tube segment 268 of the head pressure counterbalancing unit 224n, and is formed with radial ports 300 so that the liquid of the column (not shown) is contained in the chamber 302 above the top surface 303 of the head portion 292 of the plunger 290, and since the liquid is present in this chamber, the downwardly moving sonic pressure waves will also be admitted through the ports 300.

The purpose for the head pressure counterbalancing unit(s) 224 will now be apparent upon considering that the head pressure of the liquid column (not shown) will exert a downwardly directed force on the top surface 303 of the head portion 292 of the plunger 290, and the spring(s) 272, FIG. 13, counterbalance that head pressure.

The head portion 292 of the plunger 290 is reciprocally movable in the bore 282 of the housing 280 as hereinbefore mentioned, and is provided with a suitable seal 305. The depending spool valve body 294 has a bottom land area 306 which is reciprocally movable in the bore 288 of the liquid intake housing 286 and the lower land 306 is provided with a suitable seal 307. As shown, the area between the head portion 292 and the bottom land 306 defines a chamber 308 below the head portion 292 within the bore 282 of the housing 280. That chamber 308 is a gas relief chamber which vents gas, which may leak into the chamber, through a relief port 310 formed in the side of the housing.

The lower end of the plunger 290 has a check valve body 312 threadingly mounted thereon with a valve seat 313 formed in the axial passage of the valve body. A spacer sleeve 314, having slots 315 formed in the depending end thereof, is fixedly mounted at the top of the axial passage of the check valve body 312. A ball valve 316 is mounted in the check valve body 312 and will be normally in seated engagement with the valve seat 313 to yieldably close the passage through the check valve body 312. The ball valve 316 will thus prevent the downward flow of the liquid column in the pump of the present invention but will allow upward flow of the liquid 17 (FIG. 1). The slotted spacer sleeve 314 will prevent the ball valve 316 from interfering with the upward flow of the liquid 17.

As hereinbefore mentioned, the liquid intake unit 228 includes a cylindrical housing 286 having the bore 288 formed therein. The lower end of the bore 288 has check valve means 318 mounted therein in the illustrated form of an axially aligned pair of check valve bodies 320 each of which has a ball valve 322 mounted therein so as to normally close the liquid inlet port 324 provided in the bottom end of the liquid intake housing 286. The bore 288 of the housing 286 provides the liquid intake unit 228 with a liquid charging chamber 326 into which the liquid 17 is movable through the check valve means 318, with the check valve means preventing reverse liquid flow.

As hereinbefore mentioned, exactly what occurs in the sonic pressure wave pump of the present invention is not clearly understood. However, extensive testing and experimentation have shown that the pump has unexpectedly high production capabilities in view of the relatively low power consumption. Those tests and experiments lead me to believe that the pump operates in accordance with the following.

Cyclic impacting of the liquid column by the piston 150 of the generator 152 produces sonic pressure waves in the liquid column, and those pressure waves move, as hereinbefore described, through the flexible production tube 22 or 22a, 22b, to the subterranean pumping assembly 24. When the sonic pressure waves enter into the chamber 302 above the head portion of the plunger 290, they drive the plunger downwardly which causes partial evacuation of the contents of the liquid charging chamber 326 upwardly through the check valve body 312. At the commencement of pumping operations, the contents of the chamber 326 will most likely be mostly gaseous in nature, with some liquid may seep into that chamber from the subterranean liquid source due to differential pressures. When the plunger 290 returns to its normal position, a rarification will exist in the chamber 326 and the liquid 17 will be drawn into that chamber. When the chamber 326 is fully charged, the next downstroke of the plunger will admit the liquid 17 to the axial passage 296 of the plunger.

The sonic pressure waves which move downwardly through the production tube 22 impinge on the top surface of the plunger 290 and are reflected back through the ports 300 into the column of liquid in the subterranean pumping assembly 24 and move upwardly through the flexible production tube 22, and the liquid admitted to the plunger passage 296 is carried with those reflected sonic pressure waves.

The reason for the apparent ease with which the reflected sonic pressure waves carry the liquid to the surface is the main thing which is not understood in the operation of the pump of the present invention. It is felt that the downwardly moving sonic pressure waves form some sort of a membrane which reduces the friction which would normally exist, and this allows the reflected waves to move the liquid upwardly in a frictionless, or at least a reduced friction, manner. Possibly, the upwardly moving spiral-like movement path of the reflected sonic pressure waves act like a leak screw or worm gear, which alone, or in conjunction with the above suggested membrane, allows the reflected waves to move the liquid upwardly in an apparently effortless manner.

The nature of the sonic pressure waves is unknown as hereinbefore noted. However, it is known that they are sonic in nature due to the noise which radiates from all points along the flexible production tube 22 during pumping operations.

While the principles of the invention have now been made clear in illustrated embodiments, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A sonic pressure wave surface operated pump with extensibly retractable pumping assembly for movement toward and away from a liquid to be pumped, said pump having a column of liquid therein and comprising:
   (a) a sonic pressure wave generator having a reciprocally operable piston for cyclically impacting the column of liquid;
   (b) a flexible production tube coupled to said generator;
   (c) a rotatable reel having at least a portion of said flexible production tube wound thereon;
   (d) means coupled to said reel for selective driving of said reel in a first direction which unwindingly extends said flexible production tube toward the liquid to be pumped and in a second direction for rewinding retraction of said flexible production tube;
   (e) said piston of said generator having a central recess formed in its liquid impacting face for generating the sonic pressure waves which move through said flexible production tube;
   (f) a pumping assembly on the extensible end of said flexible production tube for movement therewith into communication with the liquid to be pumped when said reel is driven in said first direction, said pumping assembly having means for impingingly receiving the sonic pressure waves from said flexible production tube and responding by admitting the liquid to be pumped into said pumping assembly and reflecting the impinging sonic pressure waves to cause them to move back through said flexible production tube and carry the admitted liquid in the same direction; and
   (g) a sonic pressure wave intensifier/induction unit interposed between the extensible end of said flexible production tube and said pumping assembly for receiving the sonic pressure waves from said flexible production tube, said intensifier/induction unit having means for increasing the velocity of the sonic pressure waves and directing them into said pumping assembly.

2. A sonic pressure wave surface operated pump as claimed in claim 1 wherein said sonic pressure wave intensifier/inductor unit comprises:
   (a) a housing mounted on the extensible end of said flexible production tube and having a bore of larger diameter than the bore of said flexible production tube and having a truncated conical surface at the upper end of said bore which forms the transition between the bore of said flexible production tube and the bore of said housing;

(b) an elongated tubular body having a smaller diameter than the bore of said housing and having an axially extending bore, said body mounted in said housing to close the bore of said housing at the lower end thereof and disposed to extend coaxially upwardly in the bore of said housing;

(c) a head on the upper end of said body for closing the bore thereof, said head including an inverted conical projection extending axially downwardly into the bore of said body;

(d) a first plurality of vertically aligned apertures formed in one side of said tubular body and each lying on an axis which slopes inwardly and downwardly into the bore of said body;

(e) a second plurality of vertically aligned apertures formed on the diametrically opposed side of said tubular body and each lying on an axis which slopes inwardly and downwardly into the bore of said body; and (f) said first plurality of apertures upwardly disposed with respect to said second plurality of apertures.

3. A sonic pressure wave surface operated pump with extensibly retractable pumping assembly for movement toward and away from a liquid to be pumped, said pump having a column of liquid therein and comprising:

(a) a sonic pressure wave generator having a reciprocally operable piston for cyclically impacting the column of liquid, said sonic pressure wave generator including, I. a housing having a cylindrical bore in which said piston is reciprocally movable and having an opening which opens axially into said bore adjacent the liquid impacting face of said piston with the opening being of inverted truncated conical configuration to form a sonic nozzle, II. said housing having an endless sidewall which defines said bore with a circumferential array of apertures formed therein adjacent the axial opening of said housing, III. a jacket circumscribingly and spacedly arranged about said endless sidewall to provide an annular chamber therebetween, said jacket having a liquid delivery output port;

(b) a flexible production tube coupled to said generator;

(c) means coupled to said housing for coupling said flexible production tube thereto to place it in liquid communication with said bore via the axial opening of said housing so that the liquid column extends into said bore;

(d) a rotatable reel having at least a portion of said flexible production tube wound thereon;

(e) means coupled to said reel for selective driving of said reel in a first direction which unwindingly extends said flexible production tube toward the liquid to be pumped and in a second direction for rewinding retraction of said flexible production tube;

(f) said piston of said generator having a central recess formed in its liquid impacting face for generating the sonic pressure waves which move through said flexible production tube; and (g) a pumping assembly on the extendable end of said flexible production tube for movement therewith into communication with the liquid to be pumped when said reel is driven in said first direction, said pumping assembly having means for impingingly receiving the sonic pressure waves from said flexible production tube and responding by admitting the liquid to be pumped into said pumping assembly and reflecting the impinging sonic pressure waves to cause them to move back through said flexible production tube and carry the admitted liquid in the same direction.

4. A sonic pressure wave surface operated pump as claimed in claim 3 wherein the central recess formed in the liquid impacting face of said piston of said sonic pressure wave generator is of truncated conical configuration.

5. A sonic pressure wave surface operated pump as claimed in claim 3 wherein the central recess formed in the liquid impacting face of the piston of said sonic pressure wave generator is of truncated conical configuration which communicates with a blind cylindrical bore formed axially in said piston.

6. A sonic pressure wave surface operated pump as claimed in claim 3 wherein said means coupled to said reel for selective driving thereof comprises:

(a) drive means;

(b) a transmission coupled to receive power from said drive means and coupled to drive said reel, said transmission having a first operating mode for driving said reel in its first direction, a second operating mode for driving said reel in its second direction and a neutral operating mode for allowing said reel to be stationary; and (c) control means coupled to said transmission for selectively switching between the operating modes thereof.

7. A sonic pressure wave surface operated pump as claimed in claim 6 and further comprising brake means movable into braking engagement with said reel.

8. A sonic pressure wave surface operated pump as claimed in claim 3 wherein the circumferential array of apertures formed in the sidewall of said housing includes a plurality of apertures each disposed on a radial axis.

9. A sonic pressure wave surface operated pump as claimed in claim 8 wherein said flexible production tube includes at least one flexible tubing body having fitting means on the opposite ends thereof and having a flexible metallic ply forming a part of said body which is in contact with the fittings on the opposite ends of said body.

10. A sonic pressure wave surface operated pump as claimed in claim 3 wherein said means coupled to said housing for coupling said production tube thereto includes a liquid coupling joint means.

11. A sonic pressure wave surface operated pump as claimed in claim 10 wherein said liquid coupling joint means comprises:

(a) a stationary body having an axial bore which is in liquid communication with said cylindrical bore of said housing, said bore of said stationary body opening onto its periphery;

(b) a rotary body journaled for rotation about said stationary body and having a radial bore which is in liquid communication with the periphery of said stationary body; and (c) fitting means in the radial bore of said rotary body to which said flexible production tube is connected.

12. A sonic pressure wave surface operated pump as claimed in claim 3 wherein said pumping assembly comprises:

(a) an operating mechanism having a reciprocally movable plunger with a head portion for supporting the liquid column and impingingly receiving the sonic pressure waves from said flexible production tube and responding by moving downwardly and reflecting the sonic pressure waves back through said flexible production tube, the plunger having a valve body depending from its head portion and having an axial passage;

(b) check valve means in the axial passage of the plunger of said operating mechanism which allows liquid flow upwardly thereinto;

(c) means for biasing the plunger of said operating mechanism upwardly;

(d) a liquid intake unit on the depending end of said operating mechanism and defining a liquid charging chamber which is in communication with the liquid to be pumped;

(e) check valve means in said liquid intake unit which allows liquid flow into the liquid charging chamber thereof; and (f) the valve body of said plunger of said operating mechanism being reciprocally movable in the liquid charging chamber of said liquid intake unit whereby a downstroke of the plunger will force the contents of the liquid charging chamber into the axial passage of the plunger and an upstroke of the plunger will draw the liquid to be pumped into the liquid charging chamber of said liquid intake unit.

13. A sonic pressure wave surface operated pump as claimed in claim 12 wherein said means for biasing the plunger of said operating mechanism including at least one head pressure counterbalancing unit which biases the plunger with an amount of force substantially equal and countercurrent to a specific amount of head pressure exerted by the liquid column.

14. A sonic pressure wave surface operated pump as claimed in claim 12 and further comprising a sonic pressure wave intensifier/induction unit connected to the extensible end of said flexible production tube for receiving the sonic pressure waves therefrom, said intensifier/induction unit having means for increasing the velocity of the sonic pressure waves and directing them into said operating mechanism.

15. A sonic pressure wave surface operated pump as claimed in claim 14 wherein said sonic pressure wave intensifier/inductor unit comprises:

(a) a housing mounted on the extensible end of said flexible production tube and having a bore of larger diameter than the bore of said flexible production tube and having a truncated conical surface at the upper end of said bore which forms the transition between the bore of said flexible production tube and the bore of said housing;

(b) an elongated tubular body having a smaller diameter than the bore of said housing and having an axially extending bore, said body mounted in said housing to close the bore of said housing at the lower end thereof and disposed to extend coaxially upwardly in the bore of said housing;

(c) a head on the upper end of said body for closing the bore thereof, said head including an inverted conical projection extending axially downwardly into the bore of said body;

(d) a first plurality of vertically aligned apertures formed in one side of said tubular body and each lying on an axis which slopes inwardly and downwardly into the bore of said body;

(e) a second plurality of vertically aligned apertures formed on the diametrically opposed side of said tubular body and each lying on an axis which slopes inwardly and downwardly into the bore of said body; and (f) said first plurality of apertures upwardly disposed with respect to said second plurality of apertures.

16. A sonic pressure wave surface operated pump as claimed in claim 3 wherein the circumferential array of apertures formed in the sidewall of said housing includes a first plurality of apertures each disposed on radial axes and a lesser quantity second plurality of apertures arranged among said first plurality of apertures, said second plurality of apertures each disposed on axes which are angular with respect to the radial.

17. A sonic pressure wave surface operated pump as claimed in claim 16 wherein each of the angular axes of said second plurality of apertures is at an identical angle with respect to the radial.

18. A sonic pressure wave surface operated pump as claimed in claim 16 wherein each of the angular axes of said second plurality of apertures is at an angle of about $3\frac{1}{2}°$ with respect to the radial.

19. A sonic pressure wave surface operated pump as claimed in claim 16 wherein at least two of said first plurality of apertures are disposed between each adjacent pair of said second plurality of apertures.

20. A sonic pressure wave surface operated pump as claimed in claim 16 wherein said flexible production tube includes at least one flexible tubing body having fitting means on its opposite ends.

21. A sonic pressure wave surface operated pump as claimed in claim 16 wherein said flexible production tube includes at least one flexible tubing body having fitting means on its opposite ends and having a flexible cable extending through said flexible tubing body with means for connecting the opposite ends of said cable to the adjacent fitting means.

* * * * *